United States Patent [19]

Hirayama

[11] Patent Number: 6,112,173
[45] Date of Patent: Aug. 29, 2000

[54] PATTERN RECOGNITION DEVICE USING TREE STRUCTURE DATA

[75] Inventor: Hiroshi Hirayama, Tokyo, Japan

[73] Assignee: NEC Corporation, Tokyo, Japan

[21] Appl. No.: 09/053,070

[22] Filed: Apr. 1, 1998

[30] Foreign Application Priority Data

Apr. 1, 1997 [JP] Japan ................................. 9-082910

[51] Int. Cl.[7] ................................................ G10L 15/10
[52] U.S. Cl. ........................................ 704/242; 704/254
[58] Field of Search ................................. 704/242, 254, 704/255, 256

[56] References Cited

U.S. PATENT DOCUMENTS

| | | | |
|---|---|---|---|
| 4,718,094 | 1/1988 | Bahl et al. | 704/256 |
| 4,748,670 | 5/1988 | Bahl et al. | 704/256 |
| 5,621,859 | 4/1997 | Schwartz et al. | 704/256 |
| 5,794,189 | 8/1998 | Gould | 704/231 |
| 5,912,989 | 6/1999 | Watanabe | 382/228 |

FOREIGN PATENT DOCUMENTS

| | | | |
|---|---|---|---|
| 59-2359 | 1/1984 | Japan | H10L 27/00 |
| 4-248722 | 9/1992 | Japan | H04B 14/04 |
| 6-348292 | 12/1994 | Japan | G10L 3/00 |
| 2522154 | 5/1996 | Japan | G10L 3/00 |
| 9-34486 | 2/1997 | Japan | G10L 3/00 |

OTHER PUBLICATIONS

Takao Watanabe, Koichi Shinoda, Keizaburo Takagi, and Ken–Ichi Iso, "High–Speed Speech Recognition Using Tree–Structured Probability Density Function," Proc. ICASSP 95, p. 556–559, May 1995.

P.S. Gopalakrishnan, L.R. Bahl, and R.L. Mercer, "A Tree Search Strategy for Large–Vocabulary Continuous Speech Recognition," Proc. ICASSP 95, p. 572–575, May 1995.

Densi Josho Tsushin Gakkai Ronbunshi, Electronic Information Communications Scientific Society Articles Magazine, "Reduction of Number of Word Hypotheses for Large Vocabulary Continuous Speech Recognition", pages 2117–2124, Dec. 25, 1996.

*Primary Examiner*—David R. Hudspeth
*Assistant Examiner*—Tālivaldis Ivars Šmits
*Attorney, Agent, or Firm*—Sughrue, Mion, Zinn, Macpeak & Seas, PLLC

[57] ABSTRACT

The pattern recognition device utilizes a tree structure wherein the phoneme data is organized in a particular fashion. Specifically, the phonemes of the subordinate nodes are categorized into groups made up of similar phonemes. A phoneme that corresponds on average to the groups of subordinate nodes is established as the parent node of that group. Distances of similarity of the plurality of standard elements with respect to each of the plurality of consecutive recognition elements are calculated and stored. Parent nodes for which these distances are small are selected, and the distances with respect to recognition elements are calculated for only the subordinate nodes of the selected parent nodes. Distances stored in this way are accumulated in correspondence with tree structure data and standard data. The item of standard data for which the accumulated distance is the smallest is outputted as the recognition result.

30 Claims, 9 Drawing Sheets

PATTERN RECOGNITION DEVICE USING TREE STRUCTURE DATA

BACKGROUND OF THE INVENTION

1. Field of the Invention

The present invention relates to a pattern recognition device that recognizes recognition data, which are inputted as the sounds of words and phrases or the images of characters, as one of a plurality of items of standard data prepared in advance, aid particularly to a pattern recognition device in which standard elements are represented as tree structures.

2. Description of the Related Art

In the prior art, pattern recognition devices have been employed in speech recognition or words and phrases or in pictorial pattern recognition of characters. Among the various methods that have been proposed for speech recognition is one in which words are recognized in phoneme units.

A prior-art example of this type of pattern recognition device is first described with reference to FIGS. 1 to 6.

The pattern recognition device 1 here described is formed as a single chip, and as shown in FIG. 2, is provided with a CPU (Central Processing Unit) 101, which is a microcomputer.

This CPU 101 is connected by bus line 102 to RON (Read Only Memory) 103, RAM (Random Access Memory) 104, and I/F (Interface) 105.

CPU 101 can realize a variety of operations in accordance with various programs, and the control programs necessary for processing by CPU 101 are stored as software in ROM 103, which is an information storage medium. Storage areas for temporary storage of processing data of CPU 101 are formed in RAM 104, and I/F 105 effects the input and output of each type of data.

CPU 101 reads each type of program and executes each type of operation as described hereinabove, whereby pattern recognition device 1 as shown in FIG. 1 is logically provided with data storage section 11, element storage section 12, data input section 13, data dividing section 14, distance calculation section 15, distance storage section 16, distance accumulation section 17, and result output section 18.

Data storage section 11 is made up of prescribed storage areas formed in advance in ROM 103, and catalogues in advance a plurality of standard data items made up of a plurality of consecutive standard elements. As shown in FIG. 3, words of a natural language are catalogued as standard data in data storage section 11, and the plurality of consecutive standard elements are established as all phonemes.

Words of this type are catalogued in the graphic character code of the plurality of consecutive phonemes, and position data that indicate the storage positions in element storage section 12 are added to each unit of the graphic character code.

This element storage section 12 is also constituted by storage areas of ROM 103, and as shown in FIG. 4, all phonemes are catalogued in advance in element storage section 12 as the above-described plurality of standard elements. These standard elements also lake the character code as identification information, and as shown in FIG. 5, the speech signals of these phonemes are each set individually.

Data input section 13 accepts the input of each type of recognition data made up of a plurality of consecutive recognition elements by having CPU 101 store the input data of I/F 105 in prescribed areas of RAM 104 in accordance with the program registered in ROM 103. The recognition elements in this case are also made up from phonemes, and the recognition data are made up of speech signals of words.

Data dividing section 14 divides inputted recognition data into prescribed frames and sequentially generates a plurality of consecutive recognition elements by having CPU 101 execute prescribed data processing in accordance with a program registered in ROM 103.

Distance calculation section 15 also individually calculates the distance of similarity of the plurality of standard elements with respect to each of the plurality of consecutive recognition elements by the execution of prescribed data processing by CPU 101 in accordance with a program registered in ROM 103.

Distance storage section 16 is made up of prescribed storage areas established in advance in RAM 104 and individually temporarily stores the distances of calculated standard elements at prescribed positions of the storage areas.

Through the execution of prescribed data processing by CPU 101 in accordance with a program registered in ROM 103, distance accumulation section 17 reads out all of the standard data stored in data storage section 11, sequentially reads the distances of the plurality of standard elements making up this standard data from distance storage section 16 and accumulates tho distances, and individually calculates the distances of a plurality of items of standard data with respect to one item of recognition data.

Through the execution of prescribed data processing by CPU 101 in accordance with a program registered in ROM 103, result output section 18 selectively outputs from I/F 105 the standard data for which the accumulated distances are a minimum as the recognition result.

A pattern recognition device 1 configured according to the foregoing description can recognize the speech signals of a word, which are inputted from the outside as recognition data, as one word which is standard data catalogued in advance.

As an actual example, the speech recognition of Japanese words is explained hereinbelow. Since hiragana are used as phonetic symbols in Japanese, speech recognition is carried out based on hiragana. In the following explanation, words in italics surrounded by quotation marks represent Japanese hiragana.

Japanese hiragana can be arranged as a table of the syllabary made up of five rows and ten columns in which approximately fifty sounds are produced by the combinations of vowel sounds and consonant sounds. As shown in Table 1 below, in the syllabary, five horizontal rows correspond to the five vowel sounds "a, i, u, c, o," and ten vertical columns correspond to the ten vowel and consonant sounds "a, k, s, t, n, h, m, y, r, w."

TABLE 1

| wa | ra | ya | ma | ha | na | ta | sa | ka | a |
|---|---|---|---|---|---|---|---|---|---|
|  | ri |  | mi | hi | ni | ti | si | ki | i |
|  | ru | yu | mu | hu | nu | tu | su | ku | u |
|  | re |  | me | he | ne | te | se | ke | e |
|  | ro | yo | mo | ho | no | to | so | ko | o |

In addition, Japanese also includes voiced consonant sounds such as "ga" and "gi" "p-sounds" such as "pa" and "pi," contracted sounds such as "kya" and "kyu," double-consonant sounds such as "a-" and "i-," and the syllabic nasal sound "n." Japanese is therefore not made up of exactly 50 sounds, but this presents no problem because, as with the Western alphabet, the various sounds including the voiced consonant sounds can be represented by hiragana.

As shown in FIG. 6, when pattern recognition device 1 is used to recognize the speech signals of Japanese words, words made up of a plurality of consecutive phonemes are inputted as recognition data to data input section 13 (Step S1).

These recognition data are divided into prescribed frames by dividing section 14, and a plurality of consecutive recognition elements are generated by melcepstrum analysis (Step S2).

In simple terms, in a case in which the inputted recognition data are, for example, "ohayou," the data are divided into the four recognition elements "o, ha, yo, u." Phonemes do not actually have a one-to-one correspondence with frames and one phoneme is generally divided into a multiplicity of recognition elements, but explanation is here simplified as described above.

Distances of similarity of a plurality of standard elements with respect to each of a plurality of recognition elements successively generated as described hereinabove are calculated by distance calculation section 15, and each of the distances of standard elements thus calculated are temporarily stored by distance storage section 16 (Steps S3–S5). The distances of all standard elements are thus detected by frame for each of the plurality of consecutive recognition elements of the recognition data.

In a case in which the recognition elements of recognition data are the four phonemes "o, ha, yo, u" as described hereinabove, the distances of the standard elements of all phonemes "a, i, u -(n)" with respect to each of these four phonemes are calculated, and the distances of all of these standard elements are stored by the frame of the recognition data. Calculation of the distance of the standard element "n" is omitted only for the first frame because this phoneme never occurs at the beginning of a word in Japanese.

All of the standard data stored in data storage section 11 are read out by distance accumulation section 17, the distances of the plurality of standard elements that form these standard data are successively read out from distance storage section 16 and accumulated, and the distances of the plurality of standard data with respect to one item of recognition data are each calculated (Step S6).

If "ohayou" is catalogued as a standard data word, the distance of "ohayou" is calculated as the accumulation of the distance of the first frame made up by the standard element "o," the distance of the second frame made up by the standard element "ha," the distance of the third frame made up by the standard element "yo," and the distance of the fourth frame made up by the standard element "u." Still, as explained hereinabove, recognition data are actually divided into a multiplicity of recognition elements and these recognition elements do not bear a one-to-one correspondence with standard elements.

Here, dynamic programming is employed when the distances of words which are standard data are accumulated as described hereinabove. In such a case, distances are calculated for a plurality of combinations in which the plurality of standard elements of standard data are placed in a variety of correspondences with the large number of recognition elements of recognition data, and the minimum distance is selected as the distance of the standard data with respect to the recognition data.

Since the distances of a plurality of standard data are thus calculated for one item of recognition data, the standard data having the minimum distance is selectively outputted as the recognition result by result output section 18 (Step S7).

For example, if the distance of the standard data "konnitiwa" is 450 and the distance of the standard data "ohayou" is 120 with respect to the recognition data "ohayou," "ohayou" is outputted as the recognition result.

The above-described pattern recognition device 1 can recognize inputted recognition data as one item of standard data catalogued in advance, but the calculation of the distances of the plurality of standard elements with respect to each of a plurality of consecutive recognition elements is a huge processing burden and is extremely time-consuming.

A pattern recognition device to solve these problems is disclosed in U.S. Pat. No. 5,912,989. As shown in FIG. 7, in this pattern recognition device, tree structure data are established that take standard elements as nodes, and those data are employed to simplify the calculation of distances of standard elements.

In more detail, tree structure data are formed in a tree structure in which one root node is linked by a small number of parent nodes to a large number of subordinate nodes that individually correspond to all of the standard elements, these parent nodes bearing an average correspondence to a plurality of mutually similar standard elements.

In more specific terms, although the subordinate nodes correspond to all phonemes "a, i, u, - n," the parent nodes correspond only to the five phonemes "a, i, u, e, o" of the "a" column.

In this pattern recognition device, distances of similarity of the plurality of tree structure data parent nodes are individually calculated for recognition data that have been divided by frame into recognition elements. Next, parent nodes having small calculated distances are selected, following which The distances of subordinate nodes with respect to the recognition elements are calculated only for the subordinate nodes of the selected parent nodes while the distances of parent nodes are appropriated as the distances of subordinate nodes for which distances are not calculated.

For example, if the distances of parent nodes "a, i, u, e, o" are calculated for a case in which the recognition element is the phoneme "ka," only the distance for "a" is small and the distances for "i-o" are larger. In this case, the distances of the subordinate nodes of "a," i.e., "a-wa," are calculated with respect to "ka", but the distances of the subordinate nodes of "i," i.e., "i-ri," are not calculated, and the distance of the parent node "i" is appropriated as the distance of these subordinate nodes.

After the distances for all of the subordinate nodes have been detected as described hereinabove, they are stored as the distances of all standard elements with respect to the recognition element.

By carrying out this process frame by frame, the distances with respect to each of the consecutive recognition elements of recognition data are stored by frame for all standard elements, and the distances of a plurality of standard data with respect to one item of recognition data can therefore be calculated by appropriately reading and accumulating these distances.

As described hereinabove, the pattern recognition device of the above-described disclosure enables an increase in speed and a reduction in the processing load without reducing recognition accuracy by categorizing all standard elements according to similarity and placing them in correspondence with a small number of parent nodes, and then using distances between these parent nodes and recognition elements to bypass the calculation of distances with respect to subordinate nodes not likely to be taken as recognition results.

However, even in the above-described pattern recognition device, the phonemes that constitute the standard elements have a one-to-one correspondence with the subordinate nodes of the tree structure data, and as a result, the calculation of the distances of standard data still requires the distances of subordinate nodes for which calculation should not be necessary.

In this case, the distances of parent nodes are duplicated as the distances of subordinate nodes for which calculation has been omitted, and identical information is therefore repeatedly stored in RAM, thereby preventing reduction of the storage capacity of RAM and complicating the miniaturization of the pattern recognition device.

SUMMARY OF THE INVENTION

It is an object of the present invention to provide a pattern recognition device that allows a reduction of the storage capacity of the information storage medium that temporarily stores each type of data.

Pattern Recognition Apparatus

In an exemplary embodiment of the present invention, standard elements, which constitute the minimum units in distance calculation, and standard data, that are made up of a plurality of consecutive standard elements, are catalogued in advance. In this state, inputted recognition data are divided into recognition elements and the distances with respect to the plurality of standard elements are individually calculated. These calculated distances are accumulated in correspondence with each of a plurality of standard data. The item of standard data having the smallest accumulated distance is outputted as the result of recognition.

However, the plurality of standard elements are made to both correspond with each of the large number of subordinate nodes and to correspond on average with a small number of parent nodes. The distances between recognition elements and parent nodes are then calculated and individually stored, and the distances between recognition elements and subordinate nodes of parent nodes having small distances are individually calculated and stored. Distances stored in this way are accumulated in correspondence with tree structure data and standard data, and the item of standard data for which the accumulated distance is smallest is outputted as the recognition result.

In a second exemplary embodiment of the present invention, the large number of subordinate nodes of the tree structure data individually correspond to all of the standard elements, but calculations and storage of the distances between these subordinate nodes and recognition elements are carried out only for subordinate nodes of parent nodes for which distances are small. When the distances of standard elements are read in order to calculate the distances of standard data, the distance of the parent node is appropriated as the distance of subordinate nodes that are not stored. Accordingly, the storage of unnecessary information can be omitted, the storage capacity of work memory can be reduced, and the pattern recognition device can be made more compact.

In a third exemplary embodiment of the present invention, the pattern recognition device further includes a parent distance calculating means, a subordinate node calculating means, and a parent node selecting means. The consecutive distances of similarity of a plurality of parent nodes of tree structure data with respect to these recognition elements are each calculated by a parent distance calculating means. A parent node selecting means selects the parent node for which the distance calculated is smallest.

The distances of subordinate nodes with respect to the recognition elements are each calculated by a subordinate calculating means for only the plurality of subordinate nodes of these selected parent nodes, and the distances of parent nodes and of subordinate nodes that are calculated as described hereinabove are temporarily stored in order at predetermined positions by a distance storing means.

The distances stored in this way are accumulated corresponding to standard data by a distance accumulating means, whereby the distances of the plurality of standard data with respect to one item of recognition data are each calculated. Accordingly, the distances of subordinate nodes are read out and accumulated if the distances of subordinate nodes corresponding to standard elements are stored; and the distances of the parent nodes are read and accumulated if the distances of the subordinate nodes are not stored.

In the above-described embodiment of the present invention, the large number of subordinate nodes of tree structure data individually correspond to all of the standard elements, but the distances between these subordinate nodes and recognition elements are calculated and stored only for the subordinate nodes of parent nodes having small distances. When the distances of standard elements are read to calculate the distances of standard data, the distances of the parent nodes are appropriated as the distances of subordinate nodes for which distances are not stored.

The above-described embodiment of the present invention further includes a data storage means, a dividing input means, a tree structure and identification data. The data storing means or the element storing means is used to register each type of information in advance, and may include the storage areas of an information storage medium such as ROM or RAM. The distance storing means may be any component capable of temporarily storing the various types of information, and permits the use of storage areas of an information storage medium such as RAM or a hard disk drive (HDD).

The dividing input means divides inputted recognition data into prescribed frames and generates a plurality of consecutive recognition elements in the present invention. A melcepstrum analyzer may be used as dividing means. Additionally, dynamic programming or the Viterbi algorithm may be used as the means of accumulating distances of standard elements and calculating each of the distances of the plurality of standard data with respect to the recognition data in the present invention.

The tree structure data of this invention is a logical structure data, in which at least one root node, a small number of parent nodes, and a large number of subordinate nodes are linked in order, wherein the large number of subordinate nodes individually correspond to all of the standard elements, the small number of parent nodes each correspond on average to a plurality of standard elements, and wherein nodes may exist between the root node and parent node as well as between the parent nodes and subordinate nodes.

The identification data of each node of the tree structure data in this invention may be information that can individually distinguish a plurality of nodes and may include the use of node numbers that correspond to the tree structure or serial numbers conferred in order to all nodes.

Identifiers are further included in an exemplary embodiment of the present invention to indicate the absence or presence of calculated and stored distances. Identifiers are individually stored for each item of parent node identification data by means of an identifier storing means; and for each item of parent node identification data in which an identifier indicating the presence of distances is set, the storage positions of subordinate node distances in the distance storing means are individually stored as "position data" by means of a position storing means.

Additionally, a distance reading means reads the identifiers in accordance with the identification data of the parent nodes of the tree structure data, following which the distances of the subordinate nodes are read in accordance with the position data when the identifiers indicate the presence of distances, and the distances of the parent nodes are read from prescribed positions when the identifiers indicate that distances are not present. The identifiers of this invention may take the form of two values that indicate the absence or presence of distances, the position data are necessary only when distances are present, and both may be a single item of data.

However, since only a portion of the distances of subordinate nodes are stored, the distances of the parent node are appropriated when it is determined in accordance with identifiers that distances are not present. The storage positions of these distances of the parent node are fixed and the distances can therefore be read by merely detecting from the tree structure data the identification data of parent nodes of subordinate nodes that need distances.

In a forth exemplary embodiment of the present invention, the distance reading means calculates the storage positions of distances corresponding to tree structure data when an identifier indicates the presence of distances and the stored subordinate node distances are read out, without the aid of position data.

In a fifth exemplary embodiment of the present invention, identifiers are not used to read out the distances of the subordinate nodes. The distances of nodes that are necessary for accumulating the distances of standard data are read out according to position data, and the distances of subordinate nodes or parent nodes can be read out reliably without the need for identifiers that indicate whether distances of subordinate nodes are present or not.

In a sixth exemplary embodiment of the present invention involves a speech recognition device that performs speech recognition of words or an image recognition device that performs image recognition of characters, In the case of a speech recognition device, recognition data or standard data are established as words and recognition elements or standard elements are established as phonemes.

In a seventh exemplary embodiment of the present invention, the data input means accepts speech signals as the recognition data, and the data storing means catalogues language as the standard data. Accordingly, the speech signals inputted as recognition data can be recognized as one of a plurality of language items that are catalogued beforehand.

In an eighth exemplary embodiment of the present invention, the pattern recognition device is formed as a single chip. As a result, a plurality of items of standard data are catalogued on a single chip component, and one item of standard data is outputted when recognition data are inputted to this chip component. The chip component may be a single chip on which various types of circuits are integrated, for example; an IC (Integrated Circuit) or LSI (Large-Scale Integrated Circuit). Furthermore, methods of forming this type of chip component as a recognition device may include forming the various means for realizing each of various functions as dedicated hardware, realizing the various functions of the various means by installing programs in a general-purpose microcomputer, or combining portions of these methods.

In addition, embodiments of this invention may be formed in any way that achieves these functions, and therefore permits the use of dedicated hardware, computers in which programs are installed by means of software, and functions realized within a computer by a program, or a combination of these.

Method Embodiments

An exemplary embodiment of the present invention involves a method for pattern recognition wherein the method involves the steps of: cataloguing standard data and free structure data in advance, accepting input data, dividing inputted data into recognition data, calculating the distances of the parent nodes tree structure data in relation to the recognition elements, selecting the parent nodes with the smallest distances, individually calculating distances of subordinate nodes of the small parent nodes in regards to recognition elements, storing the calculated distances of the parent and subordinate nodes, calculating the distance for one item of recognition data by accumulating distances of standard data and outputting the smallest result.

Information Storage Medium Embodiment

An information storage medium is a further embodiment of the present invention on which software is stored that a computer can freely access, wherein the software contains the code to enable the present invention. Accordingly, a computer that operates by reading a program on the information storage medium is able to function as a pattern recognition device.

In addition, the information storage medium of the present invention may be any medium capable of storing, as software that a computer can freely access, a program that enables a computer to carry out various operations, and as a unit product can include a FD (Floppy Disk), a CD (Compact Disk)-ROM, ROM that functions as a part of a computer system, or a HDD.

The above and other objects, features and advantages of the present invention will become apparent from the following description with reference to the accompanying drawing which illustrate examples of the present invention.

DETAILED DESCRIPTION OF THE PREFERRED EMBODIMENTS

Figure 1:
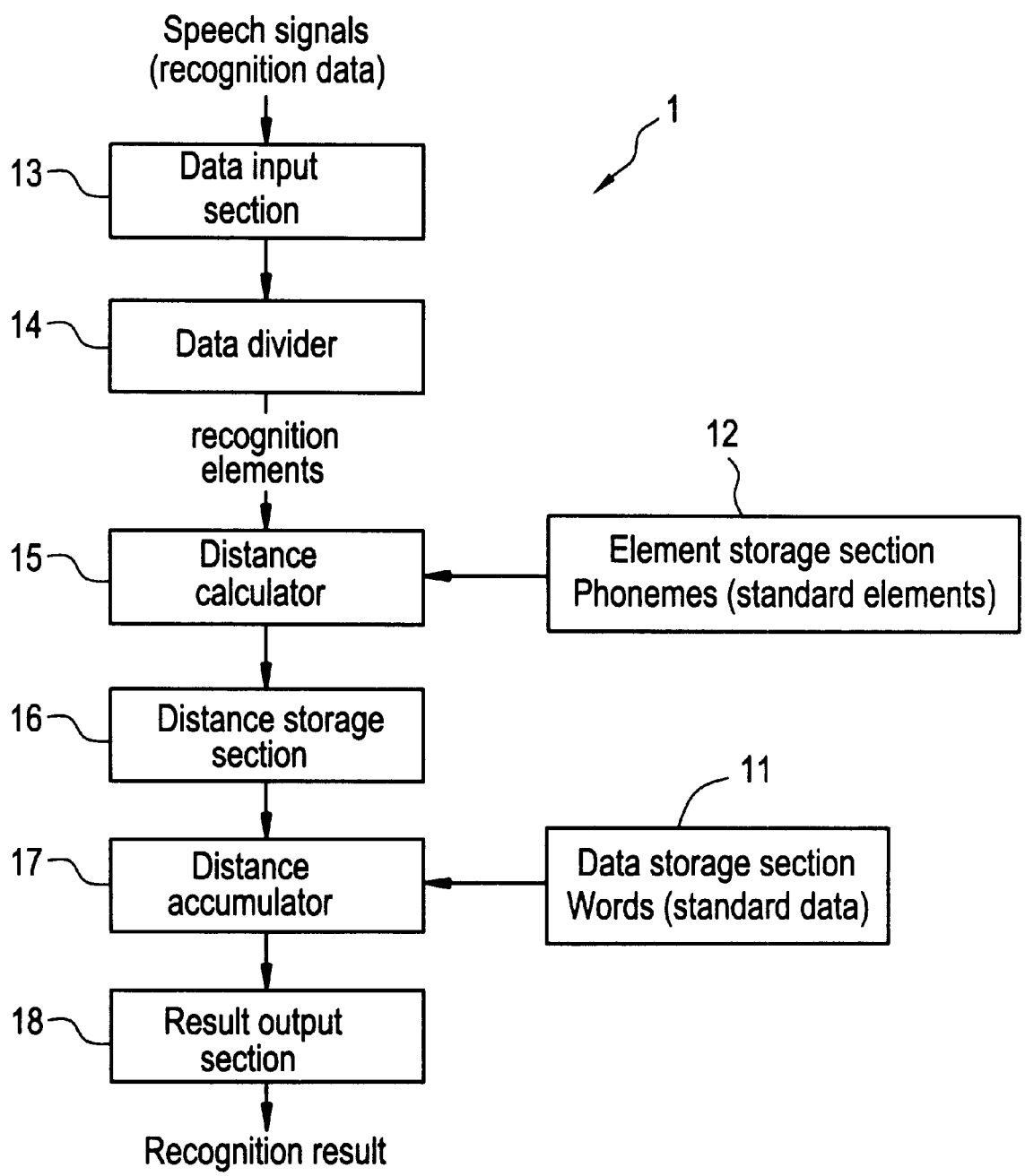
FIG. 1 is a schematic view showing the logical configuration of one example of a pattern recognition device of the prior art.
Figure 2:
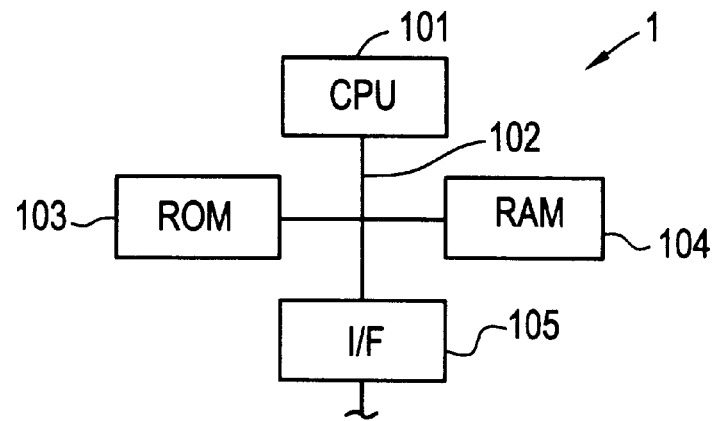
FIG. 2 is a block diagram showing the physical configuration of a pattern recognition device.
Figure 3:
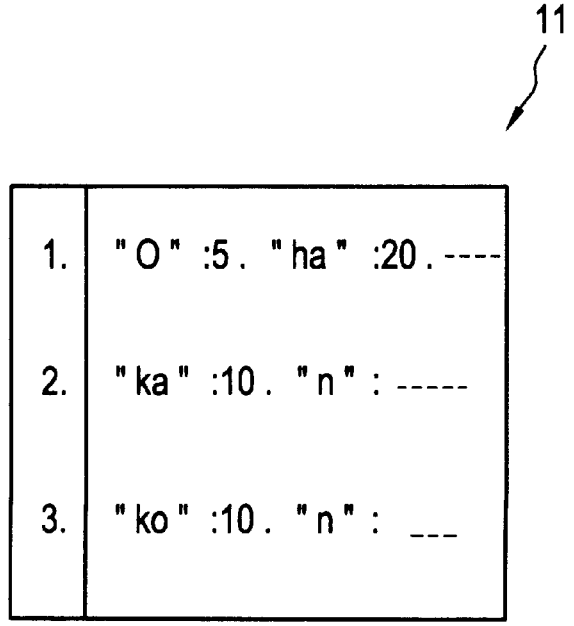
FIG. 3 is a schematic view showing the memory content of a data storage section.
Figure 4:
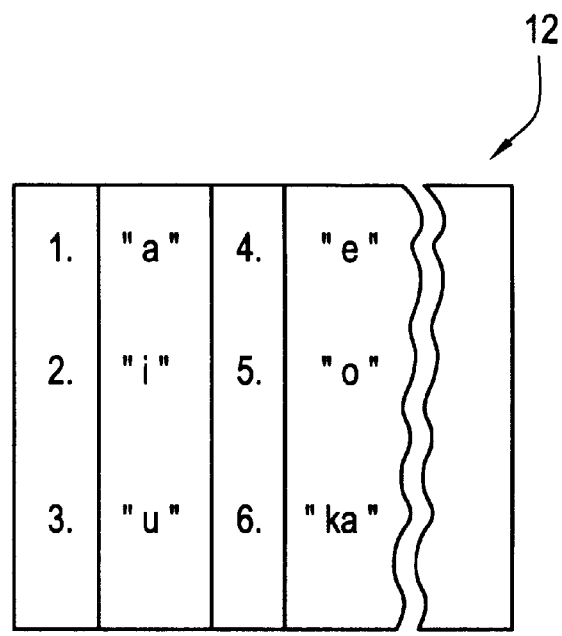
FIG. 4 is a schematic view showing the memory content of an element storage section.
Figure 5:
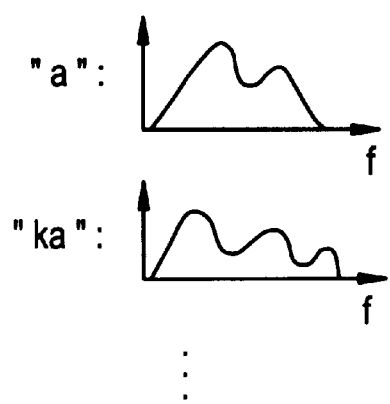
FIG. 5 is a characteristics chart showing the speech signals of phonemes which constitute the standard elements.
Figure 6:
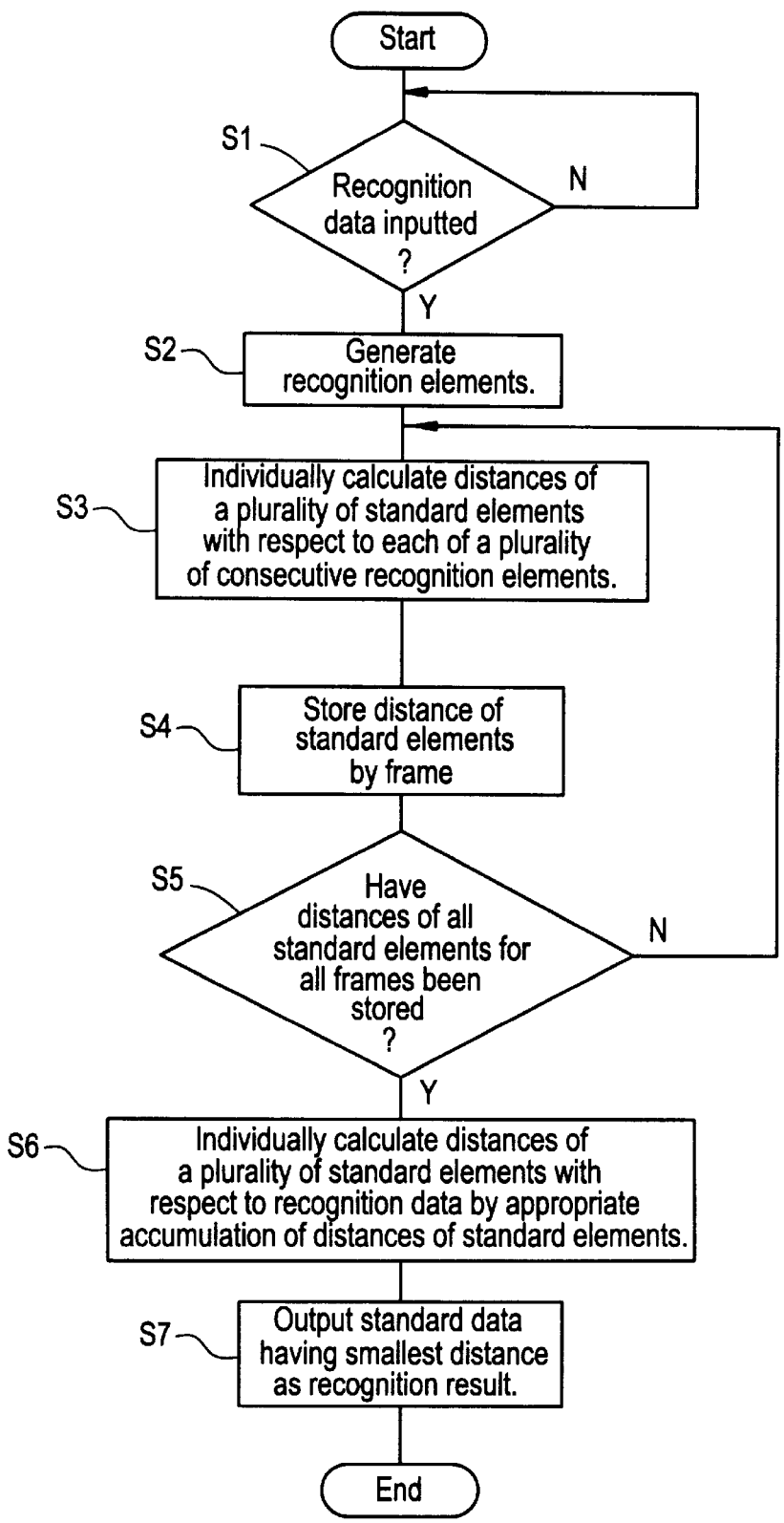
FIG. 6 is a flow chart showing a pattern recognition method of the prior art.
Figure 7:
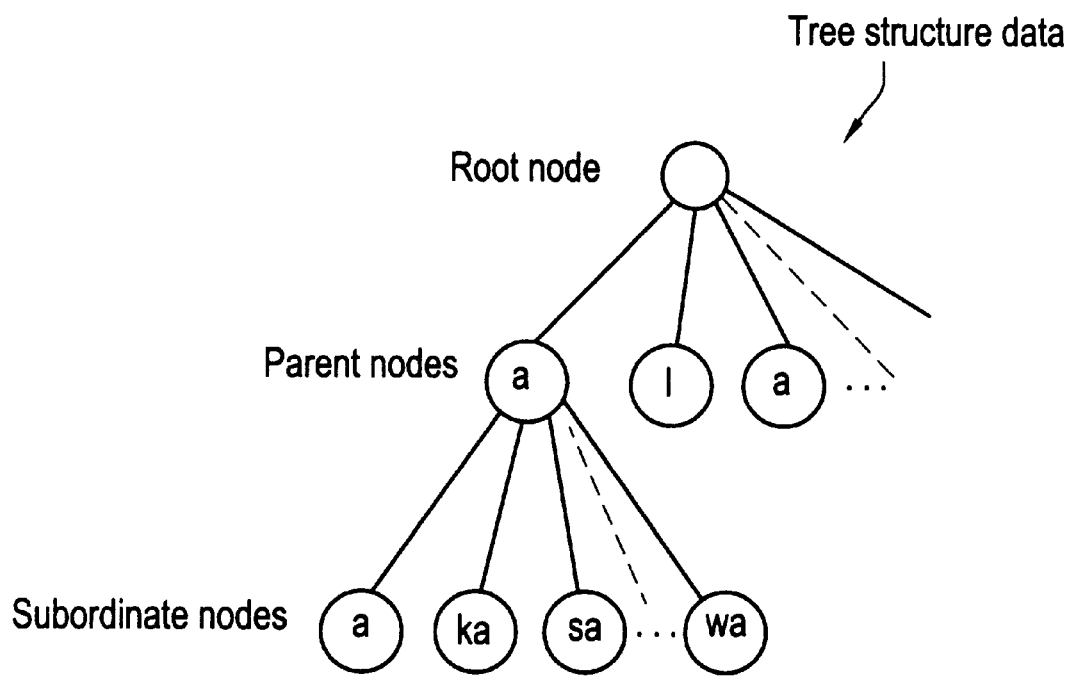
FIG. 7 is a schematic view showing tree structure data.

An embodiment of the present invention is next explained with reference to FIGS. 8 to 12. In this embodiment of the present invention, detailed explanation is omitted regarding constituent elements that are identical to those of the prior-art example, and these elements are identified by the same names and reference numerals.

Figure 9:
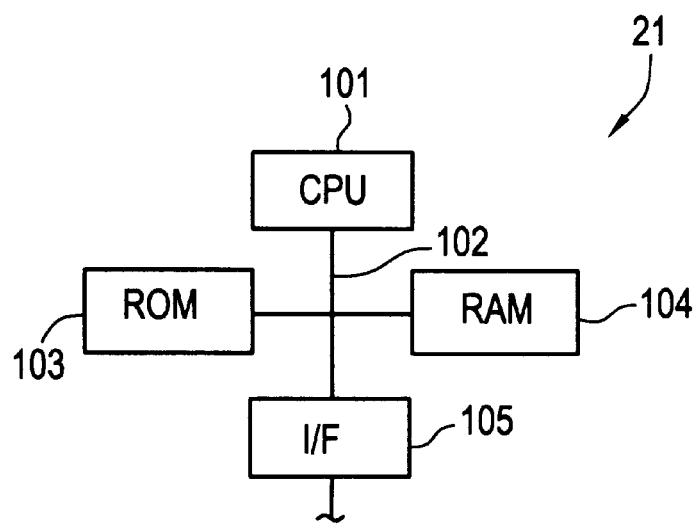
FIG. 9 is a block diagram showing the physical configuration of a pattern recognition device.

Pattern recognition device 21 of this embodiment is also formed as a single chip such as an IC or LSI, and as shown in FIG. 9, a microcomputer CPU 101 is provided. This CPU 101 is connected by means of bus line 102 to ROM 103, RAM 104 and I/F 105.

CPU 101 can carry out various processing operations in accordance with a control program, and a control program necessary for the processing operations of CPU 101 is stored as software in ROM 103, which is an information storage medium. Storage areas for temporarily storing processing data of CPU 101 are formed in RAM 104, and I/F 105 carries out the input and output of the various information.

The pattern recognition device 21 of this embodiment realizes various functions by the reading out of various programs and the execution of various operations by the above-described CPU 101.

Figure 8:
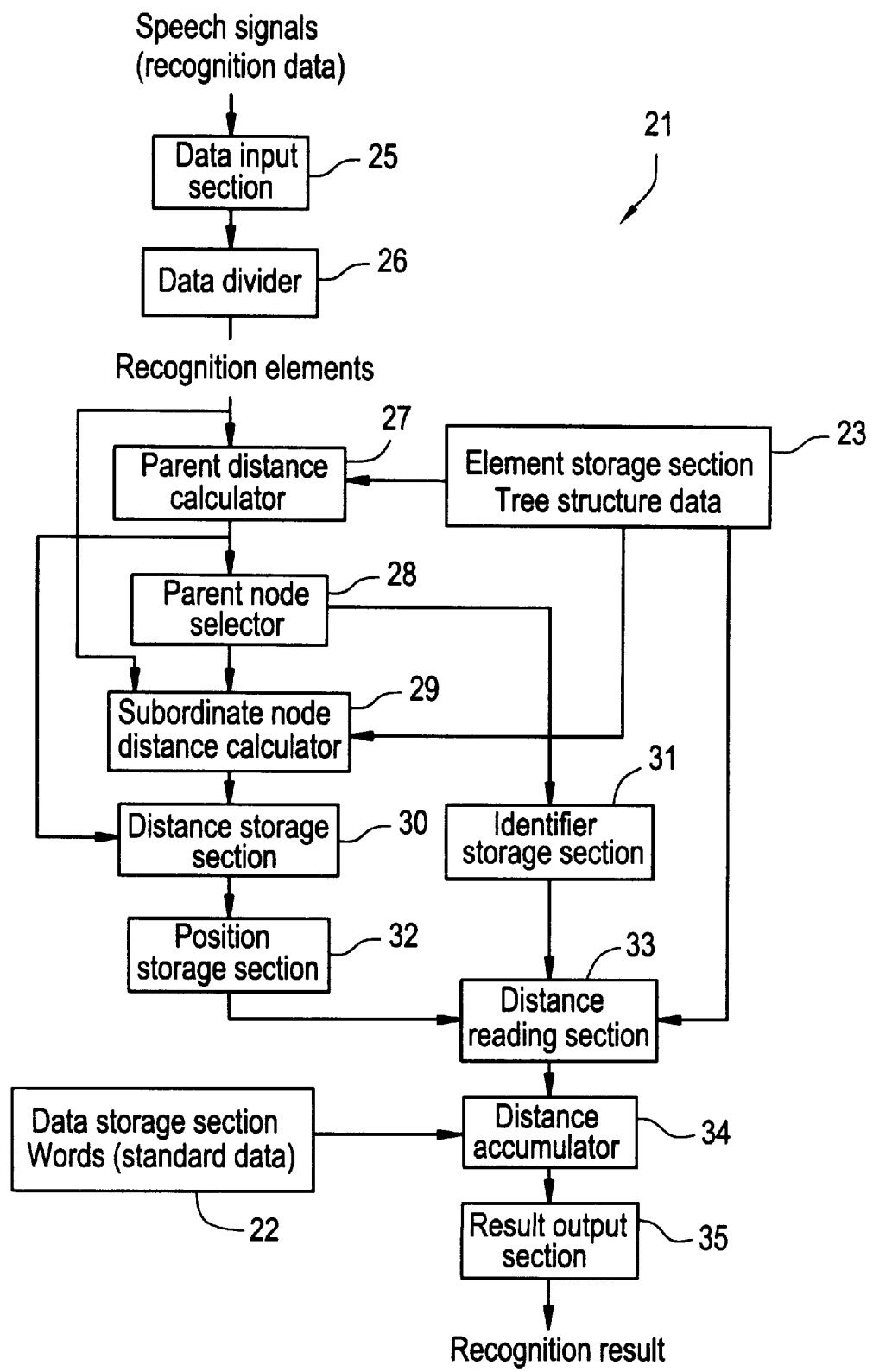
FIG. 8 is a schematic view showing the logical configuration of a pattern recognition device according to an embodiment of the present invention.

As shown in FIG. 8, pattern recognition device 21 is logically provided with: data storage section 22, element storage section 23, data input section 25, data divider 26, parent distance calculator 27, parent node selector 28, subordinate distance calculator 29, distance storage section 30, identifier storage section 31, position storage section 32, distance reading section 33, distance accumulator 34, and result output section 35.

Data storage section 22 is constituted by, for example, prescribed storage areas formed in advance in ROM 103 with a plurality of words each made up from a plurality of consecutive phonemes catalogued in advance as standard data. Element storage section 23 is also constituted by storage areas in ROM 103 and catalogues in advance data of a single tree structure that corresponds to all of the phonemes, which are the multiplicity of standard elements.

In more concrete terms, the tree structure data possesses one root node connected to twenty parent nodes. Each of these twenty parent nodes is connected to three subordinate nodes, the tree structure data therefore having 60 (=20×3) subordinate nodes.

As described hereinabove, the Japanese syllabary includes 50 phonemes, and although there are actually other sounds such as voiced consonants and p-sounds, the syllabary also includes phonemes having the same pronunciation, so the total number of 60 phonemes necessary for word recognition are each set to a respective node of the 60 subordinate nodes. The phonemes of these subordinate nodes are categorized into twenty groups each made up of three similar phonemes, and a phoneme that corresponds on average to the three subordinate nodes of each group is established as the parent node of that group.

The numbers 1–20 are added to these twenty parent nodes as identification data, and the numbers 1–3 are added as identification data to the three subordinate nodes of each group. The combinations of the numbers of the parent nodes and subordinate nodes are conferred upon the 60 standard elements as identification data, and added to data storage section 22 as one portion of the tree structure data.

Figure 10:
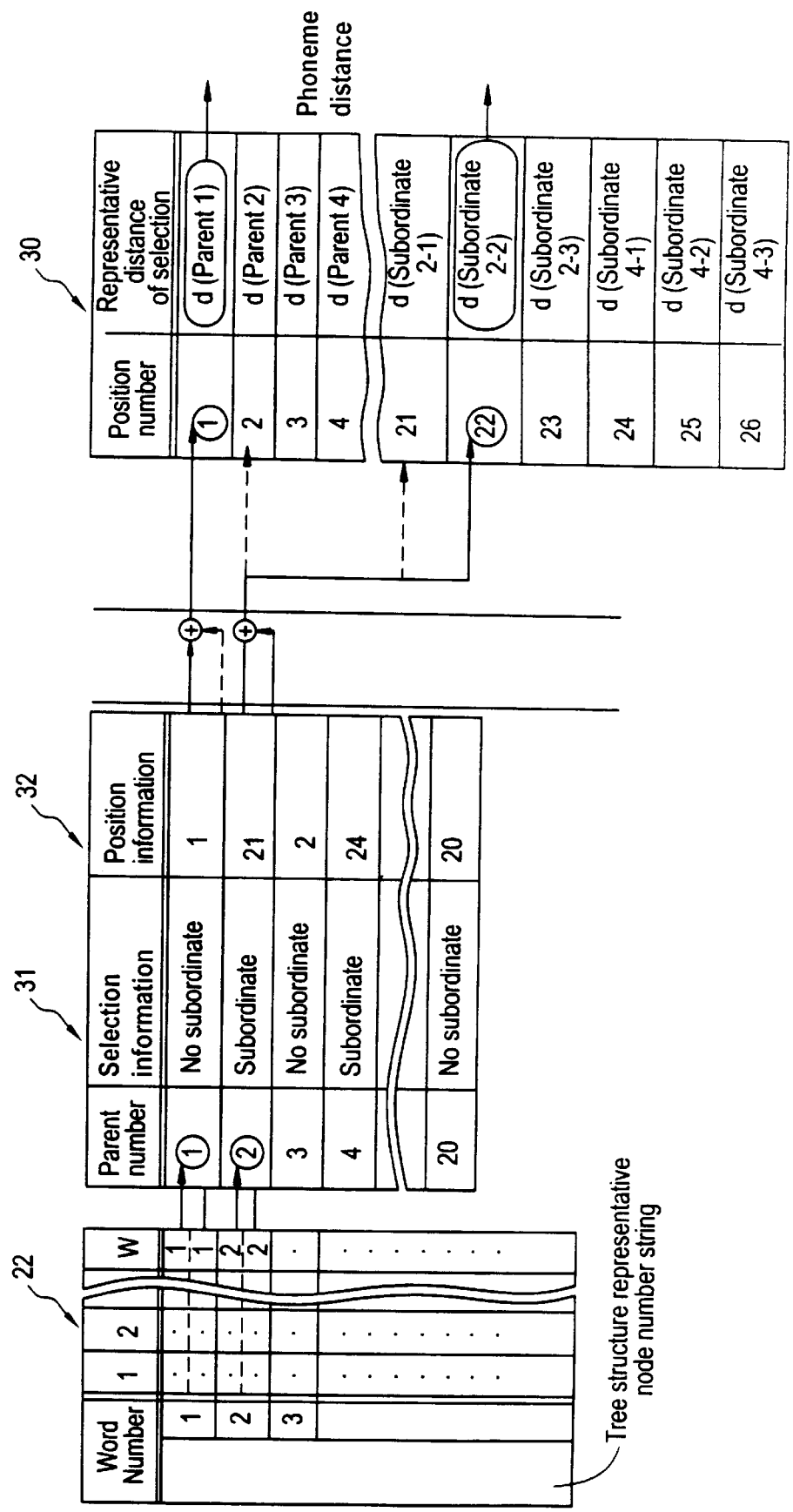
FIG. 10 is a schematic view showing the memory content of the structure storage section.

As shown in FIG. 10, words, which are the standard data, are catalogued in data storage section 22 by means of a plurality of standard elements, and these standard elements are catalogued as the combination of numbers of the parent nodes and subordinate nodes of the tree structure data.

Data input section 25 accepts the input of each of various types of recognition data made up of a plurality of consecutive recognition elements by, for example, a process in which CPU 101 stores the input data of I/F 105 in prescribed areas of RAM 104 in accordance with a program registered in ROM 103. Here, the recognition elements are made up of phonemes, and the recognition data are made up of the speech signals of words.

Data divider 26 divides the input recognition data into prescribed frames and generates a plurality of consecutive recognition elements through the execution of prescribed data processing by CPU 101 in accordance with the program registered in ROM 103.

As described hereinabove, the speech signals, which are the recognition data of words, are divided by a huge number of frames into recognition elements of extremely short time interval, and for the sake of simplifying the explanation here, the recognition elements will be considered to be individually generated as single phonemes of the syllabary.

Similarly, by means of the execution of prescribed data processing by CPU 101 in accordance with the program registered in ROM 103, parent distance calculator 27 calculates the distances of similarity of parent nodes of the tree structure data with respect to the recognition elements; parent node selector 28 selects the two parent nodes having the smallest calculated distances; and subordinate distance calculator 29 individually calculates the distances with respect to the recognition elements of the plurality of subordinate nodes of the selected parent nodes.

Distance storage section 30 is made up of, for example, prescribed storage areas of RAM 104 that are set in advance and temporarily stores the distances calculated by the two distance calculators 27 and 29 in order at predetermined positions.

In more concrete terms, twenty storage positions for storing the distances of twenty parent nodes and six storage positions for storing the distances of six subordinate nodes are formed in distance storage section 30 as shown in FIG. 10, distance storage section 30 thereby being provided with 26 storage positions.

Although the twenty parent nodes have a fixed one-to-one correspondence with the twenty storage positions, only six storage positions are provided for storing the distances of the 60 subordinate nodes. Consequently, the subordinate nodes for which distances are stored here are not specified, and instead, the six distances of the subordinate nodes of the two parent nodes selected for having short distances are stored in order.

Identifier storage section 31 and position storage section 32 are constituted by, for example, prescribed storage areas set in advance of RAM 104, and, as shown in FIG. 10, identifier storage section 31 individually stores identifiers that indicate the presence or absence of subordinate node distances for each item of parent node identification data.

For each item of parent node identification data in which an identifier is set indicating the presence of distances, position storage section 32 individually stores as position data the storage positions in distance storage section 30 of the subordinate node distances. For each item of parent node identification data in which an identifier is set indicating that distances are not present, position storage section 32 individually stores as position data the storage positions in distance storage section 30 of the distance of the relevant parent node.

Similarly, by the execution of prescribed data processing by CPU 101 in accordance with the program registered in ROM 103, distance reading section 33 reads out identifiers from identifier storage section 31 according to the identification data of the parent node of the tree structure data, reads out the distances of the subordinate nodes from distance storage section 30 in accordance with the position data when the identifier indicates that distances are present, and reads out the distance of the parent node from distance storage section 30 in accordance with the position data when the identifier indicates that distances are not present.

Distance accumulator 34 individually calculates the distances of a plurality of items of standard data with respect to one item of recognition data by accumulating the distances read as described hereinabove as the distances of the standard elements corresponding to standard data; and as the recognition result, result output section 35 selectively outputs from I/F 105 the item of standard data having the smallest accumulated distance.

Each of the various means described hereinabove are realized by using hardware such as I/F 105 as necessary, but the core components are realized through the operation of CPU 101 in accordance with the software written to an information storage medium such as ROM 103 or RAM 104.

This type of software is, for example, stored in ROM 103 or RAM 104 as a control program that allows CPU 101 to: accept the input of various recognition data to I/F 105; divide the inputted recognition data into prescribed frames and generate a plurality of consecutive recognition elements; individually calculate distances of similarity of a plurality of parent nodes of the tree structure data with respect to the generated recognition elements; select the parent nodes having small calculated distances; individually calculate the distances of the plurality of subordinate nodes of the selected parent node with respect to the recognition elements; store the calculated distances of the parent node and of the subordinate nodes in order at predetermined positions in RAM 104; individually calculate distances of a plurality of items of standard data with respect to one item of recognition data by accumulating the stored distances corresponding to the standard data; and selectively outputting from, for example, I/F 105 the item of standard data for which the accumulated distance is smallest as the recognition result.

A control program that accumulates the distances corresponding to standard data as described hereinabove is constructed so as to read out and accumulate the distances of subordinate nodes that correspond to the standard elements that make up items of standard data, and to read and accumulate the distances of the parent nodes when the distances of subordinate nodes are not stored.

To realize these processes, a control program is also stored in ROM 103 or RAM 104 that allows CPU 101 to: individually store identifiers in RAM 104 that indicate the presence or absence of subordinate node distances for each item of identification data of a parent node; individually store in RAM 104 the storage positions of the subordinate node distances as position data for every item of identification data of a parent node in which an identifier indicating the presence of distances is set; read out the identifiers according to the identification data of parent nodes of the tree structure data; and read out the distances of subordinate nodes according to position data when an identifier indicates the presence of distances.

In addition, software to be used in combination with the above-described control program may also be registered in advance as, for example, data files in RAM 104 that are freely accessible by CPU 101, this software being the standard data of a plurality of words made up from phonemes, which are a plurality of consecutive standard elements; or tree-tree structure data in which all phonemes, which are a plurality of standard elements, correspond to subordinate nodes.

In the pattern recognition device 21 of this embodiment, the tree structure data are prepared in advance by the product manufacturer that ships pattern recognition device 21, but the standard data can be freely updated by the user of pattern recognition device 21.

With the above-described configuration, pattern recognition device 21 of this embodiment can recognize the speech signals of a word inputted as recognition data from the outside as a word that is standard data catalogued in advance. A pattern recognition method realized by such a pattern recognition device 21 is next described with reference to FIG. 11 and FIG. 12.

Figure 11:
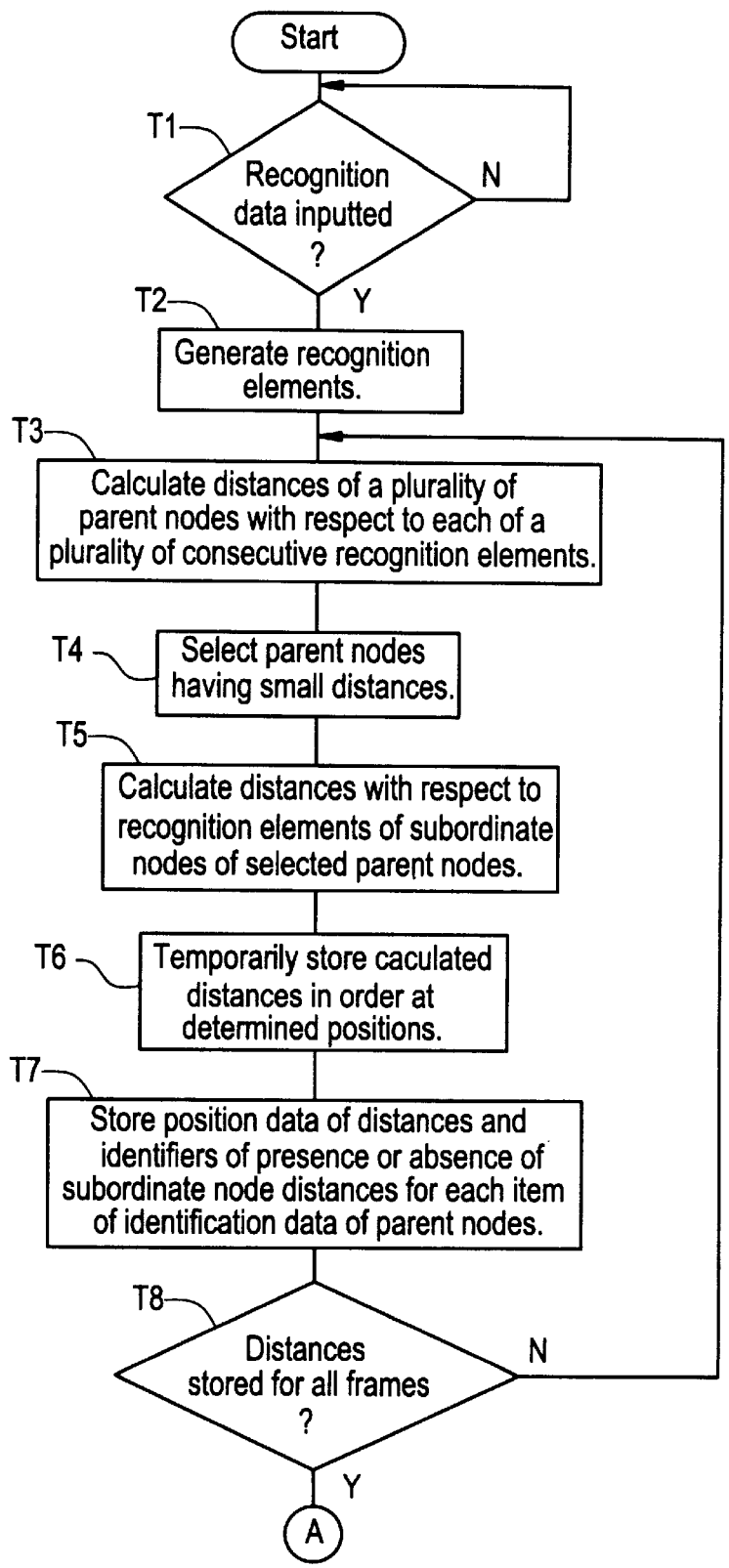
FIG. 11 is a flow chart showing the first half of the pattern recognition method by means of a pattern recognition device.

First, as shown in FIG. 11, a word made up of a plurality of consecutive phonemes is inputted as recognition data to data input section 25 (Step T1). The recognition data are divided into prescribed frames by data divider 26, and a plurality of consecutive recognition elements are generated (Step T2).

Next, the distances of similarity of twenty parent nodes of tree structure data are calculated in order by means of parent distance calculator 27 with respect to each of the plurality of consecutive recognition elements that have been generated as described hereinabove (Step T3).

The two parent nodes for which these distances are smallest are selected by means of parent node selector 28 (Step T4), and the distances corresponding to the standard elements are calculated in order by means of subordinate distance calculator 29 for the six subordinate nodes, i.e., the three subordinate nodes connected to each of these two selected parent nodes (Step T5).

The distances of the twenty parent nodes and the distances of the six subordinate nodes are calculated for each of the plurality of consecutive standard elements as described hereinabove, and these 26 distances are temporarily stored by frame by means of distance storage section 30 (Step T6).

First, the distances of 20 parent nodes with respect to a particular recognition element are individually calculated and stored, and then the distances with respect to the same recognition element are calculated and stored for the six subordinate nodes of the two parent nodes having the smallest distances, but distances with respect to the recognition elements are not calculated and stored for the 54 subordinate nodes of the 18 parent nodes having larger distances.

At this point, an identifier indicating that distances are present is stored in identifier storage section 31 together with the identification data for parent nodes for which the distances of subordinate nodes have been calculated and stored as described hereinabove, and position data indicating the storage positions of the distances of the subordinate nodes are stored in position storage section 32.

An identifier indicating that distances are not present is stored in identifier storage section 31 together with the identification data for parent nodes for which the distances of subordinate nodes have not been calculated and stored, and position data indicating the storage positions of the distances of that parent node are stored in position storage section 32 (Step T7).

The distances of all standard elements with respect to each of the plurality of recognition elements that make up one item of recognition data have all been calculated when the above-described calculation and storage of distances has been completed for all frames (Step T8).

At this point in the pattern recognition method of the pattern recognition device 21 of this embodiment, the distances of a plurality of items of standard data are calculated with respect to a single item of recognition data by reading out and accumulating the distances of the plurality of standard elements that make up a plurality of items of standard data.

Figure 12:
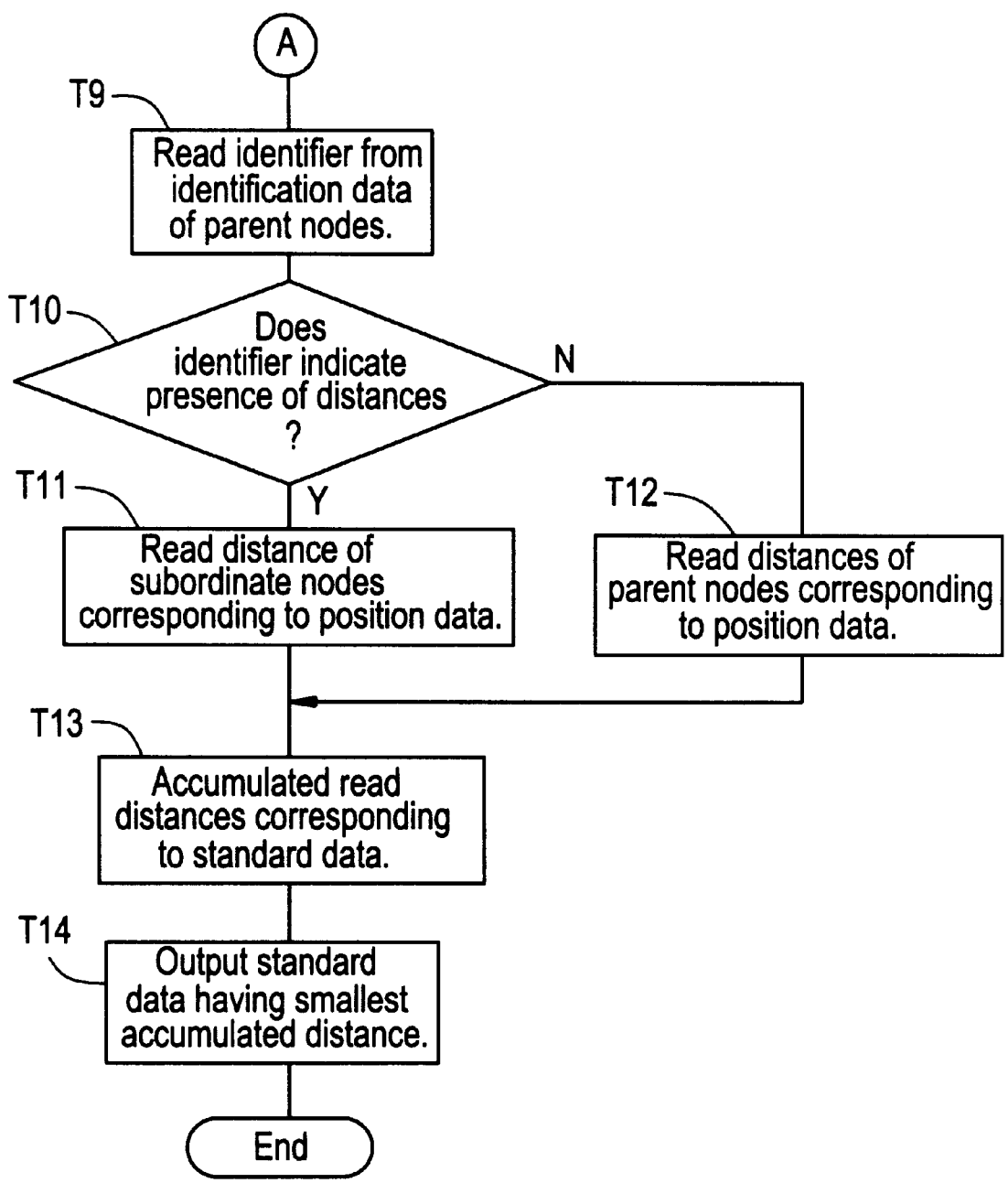
FIG. 12 is a flow chart showing the second half of a pattern recognition method by means of a pattern recognition device.

To describe this in more detail, as shown in FIG. 12, the standard elements (for which distance reading section 33 reads distances) individually correspond to the large number of subordinate nodes of the tree structure data. As a result, the identification data of the parent nodes of these subordinate nodes are read out from the tree structure data, and identifiers are read out from identifier storage section 31 in accordance with these identification data (Step T9).

If an identifier read out in this manner indicates that distances are present (Step T10), position data are read from position storage section 32, and the distances of the subordinate nodes are then read out from distance storage section 30 in accordance with this position data (Step T11).

If an identifier that has been read out indicates that distances are not present (Step T10), position data are read out from position storage section 32 and the distance of the parent node is read from distance storage section 30 in accordance with this position data (Step S12).

The position data of the distances of subordinate nodes are set so as to indicate the leading position of the distances of the three subordinate nodes linked to one parent node, and as a result, the distance of a desired subordinate node is read out by adding tree structure data to this position data.

As an example, as shown in FIG. 10, if the tree structure data are set to (2—2) in data storage section 22 for the second-frame standard element of standard data W, that standard element corresponds to the second subordinate node linked to the second parent node.

When reading out the distances of this standard element, the identifier and position data of parent-node identification data "2" are read from identifier storage section 31 and position storage section 32, and the distances are read from the positions of distance storage section 30 corresponding to these data.

For example, if the identifier indicates that distances are present and the position data indicates "21," position 2 of the parent node is taken as the reference point in distance storage section 30, and the distances are read from the position "22" obtained by adding position data to the reference point and subtracting "1."

When the distances of all of the standard elements have been read by frame as described hereinabove, they are accumulated corresponding to each of the plurality of items of standard data (Step T13), and the distances of the plurality of items of standard data with respect to the recognition data are each calculated.

The distances of a plurality of items of standard data with respect to one item of recognition data are calculated in this way, and the item of standard data having the smallest distance thus calculated is selectively outputted from result output section 35 as the recognition result (Step T14).

The pattern recognition device 21 of the present embodiment recognizes one item of recognition data as one of a plurality of items of standard data by units of standard elements as described hereinabove, and thus, has a capability analogous to recognizing one speech signal as one of a plurality of words by units of phonemes.

When calculating the distances of standard elements with respect to recognition elements as described hereinabove, the need to calculate distances for all of the large number of subordinate nodes is circumvented by first calculating the distances of the small number of parent nodes corresponding to a plurality of standard elements, and then calculating the distances of only the subordinate nodes of parent nodes having small distances.

The distances of the parent nodes are thus appropriated as the distances of the subordinate nodes for which distances are not calculated, but these parent node distances are not stored as the distances for each of the large number of subordinate nodes. Instead, the distances of the parent nodes are read as the distances of subordinate nodes when reading the distances of standard elements, thereby reducing the amount of RAM 104 required for temporary storage of distances and allowing a more compact single-chip pattern recognition device 21.

When the storage of distances of a portion of the subordinate nodes is omitted in this way, the distances between the subordinate nodes and each of the corresponding standard elements cannot be read directly. However, in the pattern recognition device 21 of this embodiment, the relation between each of the standard elements that constitute standard data and the parent nodes and subordinate nodes of the tree structure data is stored, and identifiers indicating the absence or presence of subordinate node distances and position data indicating the storage positions of distances are temporarily stored together with the identification data of the parent nodes. As a result, reading of the distances of subordinate nodes that are stored and reading of the distances of parent nodes as the distances of subordinate nodes that are not stored can both be easily performed.

The present invention is not limited to the embodiments described hereinabove but permits a variety of modifications within the limits of the spirit of the invention.

For example, in the above-described embodiments, identifiers and position data are temporarily stored together with each of the identification data of the parent nodes, and the required distances are read in accordance with these data. However, because the storage positions of the parent nodes do not change, the setting of position data to indicate the storage positions of parent nodes can be omitted when an identifier is set to indicate that distances are not present.

In addition, if the order of storing and the order of reading distances of subordinate nodes are fixed, the storage positions of distances of subordinate nodes can be calculated by simply counting the identifiers indicating the presence of distances, and the reading of distances of subordinate nodes can therefore be accomplished without using position data. Further, if the position data are set to all of the identification data of parent nodes, the necessary distances can be read even if identifiers are not set.

In the above-described embodiments, the distances between the standard elements and the recognition elements are calculated by frame in advance, and the distances between standard data and recognition data are calculated by reading these distances as appropriate. However, the distances between the standard elements and the recognition elements may also be calculated as appropriate at the time of calculating the distances between standard data and recognition data.

In the above-described embodiments, words are catalogued as standard data and speech recognition is performed with words as recognition data. However, the images of characters may be catalogued as standard data and image recognition may be performed with graphic characters as the recognition data.

In such a case, the standard elements may be established as vector information obtained by dividing a character into its constituent line segments, and the frames by which recognition data are divided may be established as blocks obtained by dividing an image vertically and horizontally.

Still further, in the above-described embodiments, two storage sections 22 and 23 are individually formed as data files, but this storing means may also be formed as one data file if the storage data are catalogued individually.

In the above-described embodiments, the software of the control program that realizes each of portions 22–35 was registered in ROM 103 beforehand. However, if the data files of the two storage sections 22 and 23 are formed separately from the control program for sections 25, 26, . . . 35 and the storage sections 22 and 23 are established so as to allow switching as necessary, the type of words that can be recognized can be varied.

However, because the tree structure data that corresponds to the standard elements are generalized and do not need alteration, element storage section 23 can be established as standard equipment while data storage section 22, in which various items of standard data are registered, can be exchanged as necessary, or standard data items may be registered in data storage section 22 as the user desires.

In the above-described embodiments, CPU 101 operates in accordance with a control program stored as software in ROM 103, thereby realizing each of sections 25, 26, . . . 35 of pattern recognition device 21.

However, each of these sections 25, 26 . . . 35 may be formed as dedicated hardware, or a portion of these sections may be stored as software in ROM 103 and a portion formed as hardware.

In the above-described embodiments, pattern recognition device 21 is composed of a single chip. However, a pattern recognition device as described hereinabove may also be realized by installing software in a general-purpose computer system.

In such a case, the software may be installed beforehand in the ROM of the computer system. Alternatively, the software may be stored on an information storage medium that can be handled as a unit such as a FD or CD-ROM, and the software may then be installed in a computer system from this information storage medium.

In other words, in a case in which each portion of the pattern recognition device of the present invention is realized by means of software, the software should be in a form that allows a CPU to read and carry out corresponding operations.

The control program for realizing each aspect of the above-described pattern recognition device may be formed as the combination of a plurality of software. In such a case, only the minimum software necessary for realizing the pattern recognition device of the present invention need be stored on an information storage medium that is a unit product.

For example, in a case in which application software is provided by means of an information storage medium such as a CD-ROM to a computer system in which an already existing operating system has been installed, the software for realizing the various portions of the pattern recognition device of the present invention is constituted by a combination of the application software and the operating system, and as a result, the portion of software that depends on the operating system may be omitted from the application software.

In addition, a method of thus supplying software that is written on an information storage medium to a computer system is not limited to directly loading the information storage medium to the computer system. For example, the above-described software may be stored to an information storage medium of a host computer, this host computer may be connected to terminal computers by a communication network, and the software may be supplied from the host computer to the terminal computers by means of data communication.

In such a case, a terminal computer may be capable of carrying out processing operations independently after having downloaded the software onto its own information storage medium. However, a terminal computer may also carry out processing operations by means of real-time data communication with the host computer without downloading the software. In this case, the entire system in which the host computer is connected to the terminal computer by a communication network is equivalent to the pattern recognition device of the present invention.

While a preferred embodiment of the present invention has been described using specific terms, such description is for illustrative purposes only, and it is to be understood that changes and variations may be made without departing from the spirit or scope of the following claims.

What is claimed is:

1. A pattern recognition device comprising:

a catalog of a plurality of items of standard data each made up of a plurality of consecutive standard elements, said plurality of items of standard data having a predetermined correspondence to prescribed recognition data;

a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

parent distance calculating means for calculating respective parent node distances of similarity for each of a plurality of recognition elements included in inputted recognition data;

parent node selecting means for selecting ones of said parent nodes based on a magnitude of said respective parent node distances of similarity;

subordinate distance calculating means for calculating respective subordinate node distances of similarity for each of said recognition elements only for ones of said subordinate nodes linked to said selected parent nodes;

distance storage means for storing only once, in order, at predetermined positions, said respective parent node distances of similarity, and for storing, in order, at other predetermined positions, only said respective subordinate node distances of similarity for said subordinate nodes of said selected parent nodes; and means for determining a recognition result based on said stored distances.

2. The pattern recognition device as set forth in claim 1, wherein said means for determining said recognition result comprises distance accumulating means for calculating respective standard data item distances for consecutive ones of said recognition elements, based on only said distances stored in said distance storing means.

3. The pattern recognition device as set forth in claim 1, wherein said means for determining said recognition result comprises distance accumulating means for calculating respective standard data item distances for consecutive ones of said recognition elements by reading and accumulating said subordinate node distances of subordinate nodes that correspond with standard elements that form standard data from said distance storing means, and reading and accumulating said parent node distances of parent nodes in place of missing subordinate node distances when said subordinate node distances are not stored in said distance storing means.

4. The pattern recognition device as set forth in claim 1, wherein said means for determining said recognition result comprises:

identifier storing means for storing, for each of said parent nodes, for each of said recognition elements, an identifier indicating the presence or absence of subordinate node distances;

position storing means for storing, as position data, the storage positions of said subordinate node distances in said distance storing means for each said identifier indicating said presence of said subordinate node distances;

distance reading means for reading said identifiers from said identifier storing means according to identification data of said parent nodes and for reading said subordinate node distances from said distance storing means corresponding to said position data when one of said identifiers indicates that said subordinate node distances are present, and for reading said parent node distances from said predetermined positions when one of said identifiers indicates that said subordinate node distances are not present; and distance accumulating means for calculating respective standard data item distances for consecutive ones of said recognition elements, based on distances read by said distance reading means.

5. The pattern recognition device as set forth in claim 1, wherein said means for determining said recognition result comprises:

identifier storing means for storing, for each of said parent nodes, for each of said recognition elements, an identifier indicating the presence or absence of subordinate node distances;

distance reading means for reading said identifiers from said identifier storing means according to identification data of said parent nodes, reading said subordinate node distances from said distance storing means when a corresponding one of said identifiers indicates that said subordinate node distances are present, and reading said parent node distances when a corresponding one of said identifiers indicates that distances are not present; and distance accumulating means for calculating respective standard data item distances for consecutive ones of said recognition elements, based on distances read by said distance reading means.

6. The pattern recognition device as set forth in claim 1, wherein said means for determining said recognition result comprises:

identifier storing means for storing, for each of said parent nodes, for each of said recognition elements, an identifier indicating the presence or absence of subordinate node distances;

distance reading means for reading said identifiers from said identifier storing means according to identification data of said parent nodes, reading said parent node distances from said distance storing means when a corresponding one of said identifiers indicates that said subordinate node distances are not present, and calculating respective storage positions of said subordinate node distances according to tree structure data and reading therefrom said subordinate node distances when a corresponding one of said identifiers indicates that said subordinate node distances are present; and distance accumulating means for calculating respective standard data item distances for consecutive ones of said recognition elements, based on distances read by said distance reading means.

7. The pattern recognition device as set forth in claim 1, wherein said means for determining said recognition result comprises:

position storing means for storing, as position data, the storage positions of said distances read from said distance storing means for each item of parent node identification data;

distance reading means for reading said position data according to the identification data of said parent nodes and, then, reading said distances; and distance accumulating means for calculating respective standard data item distances for consecutive ones of said recognition elements by accumulating said read distances.

8. The pattern recognition device as set forth in claim 1, wherein said means for determining said recognition result comprises:

position storing means for storing, for identification data of one of said parent nodes for which the subordinate node distances have been calculated, position data indicating a position of said subordinate node distances, and storing, for identification data of one of said parent nodes for which the subordinate node distances have not been calculated, position data indicating a position of said parent node distance, and storing, as position data, the storage positions of all said distances read from said distance storing means;

distance reading means for reading said position data according to the identification data of said parent nodes and, then, reading said distances; and distance accumulating means for calculating respective standard data item distances for consecutive ones of said recognition elements by accumulating said read distances.

9. The pattern recognition device as set forth in claim 1, wherein said recognition data inputted to said data input means are made up of speech signals and said standard data catalogued in said data storing means are made up of words.

10. The pattern recognition device as set forth in claim 1, formed as a single chip.

11. A pattern recognition device comprising:

data input means for receiving various inputted recognition data comprising a plurality of consecutive recognition elements;

data storing means for storing a plurality of items of standard data each made up of a plurality of consecutive standard elements, said plurality of items of standard data having a predetermined correspondence to prescribed recognition data;

element storing means for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

data dividing means for generating said plurality of consecutive recognition elements from said inputted recognition data;

parent distance calculating means for calculating respective parent node distances of similarity for each of said recognition elements;

parent node selecting means for selecting ones of said parent nodes based on a magnitude of said respective parent node distances of similarity;

subordinate distance calculating means for calculating respective subordinate node distances of similarity for each of said recognition elements only for ones of said subordinate nodes linked to said selected parent nodes;

distance storing means for storing only once, in order, at predetermined positions, said respective parent node distances of similarity, and for storing, in order, at other predetermined positions, only said respective subordinate node distances of similarity for said subordinate nodes of said selected parent nodes;

distance accumulating means for calculating respective standard data item distances for consecutive ones of said recognition elements, based on only said distances stored in said distance storing means; and result outputting means for selectively outputting standard data, for which said distances accumulated by said distance accumulating means are smallest, as the recognition result.

12. A pattern recognition device according to claim 1 wherein said recognition data inputted to said data input means are made up of speech signals and standard data catalogued in said data storing means are made up of words.

13. A pattern recognition device according to claim 1 that is formed as a single chip.

14. A pattern recognition device comprising:

data input means for receiving various inputted recognition data comprising a plurality of consecutive recognition elements;

data storing means for storing a plurality of items of standard data each made up of a plurality of consecutive standard elements, said plurality of items of standard data having a predetermined correspondence to prescribed recognition data;

element storing means for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

data dividing means for generating said plurality of consecutive recognition elements from said inputted recognition data;

parent distance calculating means for calculating respective parent node distances of similarity for each of said recognition elements;

parent node selecting means for selecting ones of said parent nodes based on a magnitude of said respective parent node distances of similarity;

subordinate distance calculating means for calculating respective subordinate node distances of similarity for each of said recognition elements only for ones of said subordinate nodes linked to said selected parent nodes;

distance storing means for storing only once, in order, at predetermined positions, said respective parent node distances of similarity, and for storing, in order, at other predetermined positions, only said respective subordinate node distances of similarity for said subordinate nodes of said selected parent nodes;

distance accumulating means for calculating respective standard data item distances for consecutive ones of said recognition elements by reading and accumulating said subordinate node distances of subordinate nodes that correspond with standard elements that form standard data from said distance storing means, and reading and accumulating said parent node distances of parent nodes in place of missing subordinate node distances when said subordinate node distances are not stored in said distance storing means; and result outputting means for selectively outputting standard data, for which said distances accumulated by said distance accumulating means are smallest, as the recognition result.

15. A pattern recognition device comprising:

data input means for receiving various inputted recognition data comprising a plurality of consecutive recognition elements;

data storing means for storing a plurality of items of standard data each made up of a plurality of consecutive standard elements, said plurality of items of standard data having a predetermined correspondence to prescribed recognition data;

element storing means for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

data dividing means for generating said plurality of consecutive recognition elements from said inputted recognition data;

parent distance calculating means for calculating respective parent node distances of similarity for each of said recognition elements;

parent node selecting means for selecting ones of said parent nodes based on a magnitude of said respective parent node distances of similarity;

subordinate distance calculating means for calculating respective subordinate node distances of similarity for each of said recognition elements only for ones of said subordinate nodes linked to said selected parent nodes;

distance storing means for storing only once, in order, at predetermined positions, said respective parent node distances of similarity, and for storing, in order, at other predetermined positions, only said respective subordinate node distances of similarity for said subordinate nodes of said selected parent nodes; identifier storing means for storing, for each of said parent nodes, for each of said recognition elements, an identifier indicating the presence or absence of subordinate node distances;

position storing means for storing, as position data, the storage positions of said subordinate node distances in said distance storing means for each said identifier indicating said presence of said subordinate node distances;

distance reading means for reading said identifiers from said identifier storing means according to identification data of said parent nodes and for reading said subordinate node distances from said distance storing means corresponding to said position data when one of said identifiers indicates that said subordinate node distances are present, and for reading said parent node distances from said predetermined positions when one of said identifiers indicates that said subordinate node distances are not present;

distance accumulating means for calculating respective standard data item distances for consecutive ones of said recognition elements, based on distances read by said distance reading means; and result outputting means for selectively outputting standard data, for which said distances accumulated by said distance accumulating means are smallest, as the recognition result.

16. A pattern recognition device according to claim 15 wherein said recognition data inputted to said data input means are made up of speech signals and standard data catalogued in said data storing means are made up of words.

17. A pattern recognition device according to claim 15 that is formed as a single chip.

18. A pattern recognition device comprising:

data input means for receiving various inputted recognition data comprising a plurality of consecutive recognition elements;

data storing means for storing a plurality of items of standard data each made up of a plurality of consecutive standard elements, said plurality of items of standard data having a predetermined correspondence to prescribed recognition data;

element storing means for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

data dividing means for generating said plurality of consecutive recognition elements from said inputted recognition data;

parent distance calculating means for calculating respective parent node distances of similarity for each of said recognition elements;

parent node selecting means for selecting ones of said parent nodes based on a magnitude of said respective parent node distances of similarity;

subordinate distance calculating means for calculating respective subordinate node distances of similarity for each of said recognition elements only for ones of said subordinate nodes linked to said selected parent nodes;

distance storing means for storing only once, in order, at predetermined positions, said respective parent node distances of similarity, and for storing, in order, at other predetermined positions, only said respective subordinate node distances of similarity for said subordinate nodes of said selected parent nodes;

identifier storing means for storing, for each of said parent nodes, for each of said recognition elements, an identifier indicating the presence or absence of subordinate node distances;

distance reading means for reading said identifiers from said identifier storing means according to identification data of sa parent nodes, reading said subordinate node distances from said distance storing means when a corresponding one of said identifiers indicates that said subordinate node distances are present, and reading said parent node distances when a corresponding one of said identifiers indicates that distances are not present;

distance accumulating means for calculating respective standard data item distances for consecutive ones of said recognition elements, based on distances read by said distance reading means; and result outputting means for selectively outputting standard data, for which said distances accumulated by said distance accumulating means are smallest, as the recognition result.

19. A pattern recognition device according to claim 18 wherein said recognition data inputted to said data input means are made up of speech signals and standard data catalogued in said data storing means are made up of words.

20. A pattern recognition device according to claim 18 that is formed as a single chip.

21. A pattern recognition device comprising:

data input means for receiving various inputted recognition data comprising a plurality of consecutive recognition elements;

data storing means for storing a plurality of items of standard data each made up of a plurality of consecutive standard elements, said plurality of items of standard data having a predetermined correspondence to prescribed recognition data;

element storing means for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

data dividing means for generating said plurality of consecutive recognition elements from said inputted recognition data;

parent distance calculating means for calculating respective parent node distances of similarity for each of said recognition elements;

parent node selecting means for selecting ones of said parent nodes based on a magnitude of said respective parent node distances of similarity;

subordinate distance calculating means for calculating respective subordinate node distances of similarity for each of said recognition elements only for ones of said subordinate nodes linked to said selected parent nodes;

distance storing means for storing only once, in order, at predetermined positions, said respective parent node distances of similarity, and for storing, in order, at other predetermined positions, only said respective subordinate node distances of similarity for said subordinate nodes of said selected parent nodes;

identifier storing means for storing, for each of said parent nodes, for each of said recognition elements, an identifier indicating the presence or absence of subordinate node distances;

distance reading means for reading said identifiers from said identifier storing means according to identification data of said parent nodes, reading said parent node distances from said distance storing means when a corresponding one of said identifiers indicates that said subordinate node distances are not present, and calculating a respective storage positions of said subordinate node distances according to tree structure data and reading therefrom said subordinate node distances when a corresponding one of said identifiers indicates that said subordinate node distances are present;

distance accumulating means for calculating respective standard data item distances for consecutive ones of said recognition elements, based on distances read by said distance reading means; and result outputting means for selectively outputting standard data, for which said distances accumulated by said distance accumulating means are smallest, as the recognition result.

22. A pattern recognition device comprising:

data input means for receiving various inputted recognition data comprising a plurality of consecutive recognition elements;

data storing means for storing a plurality of items of standard data each made up of a plurality of consecutive standard elements, said plurality of items of standard data having a predetermined correspondence to prescribed recognition data;

element storing means for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

data dividing means for generating said plurality of consecutive recognition elements from said inputted recognition data;

parent distance calculating means for calculating respective parent node distances of similarity for each of said recognition elements;

parent node selecting means for selecting ones of said parent nodes based on a magnitude of said respective parent node distances of similarity;

subordinate distance calculating means for calculating respective subordinate node distances of similarity for each of said recognition elements for only ones of said subordinate nodes linked to said selected parent nodes;

distance storing means for storing, only once, in order, at predetermined positions, said respective parent node distances of similarity, and for storing, in order, at other predetermined positions, only said respective subordinate node distances of similarity for said subordinate nodes of said selected parent nodes;

position storing means for storing, as position data, the storage positions of said distances read from said distance storing means for each item of parent node identification data;

distance reading means for reading said position data according to the identification data of said parent nodes and, then, reading said distances;

distance accumulating means for calculating respective standard data item distances for consecutive ones of said recognition elements by accumulating said read distances; and result outputting means for outputting standard data, for which said accumulated distances are smallest, as the recognition result.

23. A pattern recognition device according to claim 22 wherein said recognition data inputted to said data input means are made up of speech signals and standard data catalogued in said data storing means are made up of words.

24. A pattern recognition device according to claim 22 that is formed as a single chip.

25. A pattern recognition device comprising:

data input means for receiving various inputted recognition data comprising a plurality of consecutive recognition elements;

data storing means for storing a plurality of items of standard data each made up of a plurality of consecutive standard elements, said plurality of items of standard data having a predetermined correspondence to prescribed recognition data;

element storing means for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

data dividing means for generating said plurality of consecutive recognition elements from said inputted recognition data;

parent distance calculating means for calculating respective parent node distances of similarity for each of said recognition elements;

parent node selecting means for selecting ones of said parent nodes based on a magnitude of said respective parent node distances of similarity;

subordinate distance calculating means for calculating respective subordinate node distances of similarity for each of said recognition elements for only ones of said subordinate nodes linked to said selected parent nodes;

distance storing means for storing, only once, in order, at predetermined positions, said respective parent node distances of similarity, and for storing, in order, at other predetermined positions, only said respective subordinate node distances of similarity for said subordinate nodes of said selected parent nodes;

position storing means for storing, for identification data of one of said parent nodes for which the subordinate node distances have been calculated, position data indicating a position of said subordinate node distances, and storing, for identification data of one of said parent nodes for which the subordinate node distances have not been calculated, position data indicating a position of said parent node distance, and storing, as position data, the storage positions of all said distances read from said distance storing means;

distance reading means for reading said position data according to the identification data of said parent nodes and, then, reading said distances;

distance accumulating means for calculating respective standard data item distances for consecutive ones of said recognition elements by accumulating said read distances; and result outputting means for outputting standard data, for which said accumulated distances are smallest, as the recognition result.

26. A pattern recognition method, comprising:

a step for storing a plurality of items of standard data each made up of a plurality of consecutive standard elements, said plurality of items of standard data having a predetermined correspondence to prescribed recognition data;

a step for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

a step for receiving various inputted recognition data comprising a plurality of consecutive recognition elements;

a step for generating said plurality of consecutive recognition elements from said inputted recognition data;

a step for calculating respective parent node distances of similarity for each of said recognition elements;

a step for selecting ones of said parent nodes based on a magnitude of said respective parent node distances of similarity;

a step for calculating respective subordinate node distances of similarity for each of said recognition elements only for ones of said subordinate nodes linked to said selected parent nodes;

a step for storing only once, in order, at predetermined positions, said respective parent node distances of similarity, and for storing, in order, at other predetermined positions, only said respective subordinate node distances of similarity for said subordinate nodes of said selected parent nodes;

a step for calculating respective standard data item distances for consecutive ones of said recognition elements, based on only said distances stored in said distance storing means; and a step for selectively outputting standard data, for which said distances accumulated by said distance accumulating means are smallest, as the recognition result.

27. A pattern recognition method, comprising:

a step for storing a plurality of items of standard data each made up of a plurality of consecutive standard elements, said plurality of items of standard data having a predetermined correspondence to prescribed recognition data;

a step for storing a predetermined tree structure of data, said tree structure having a root node and a plurality of subordinate nodes, each said subordinate node corresponding to one of said standard elements; said plurality of subordinate nodes being linked by a number of parent nodes, said number of parent nodes being smaller than a number of said subordinate nodes, said parent nodes each corresponding, on average, to a plurality of mutually similar ones of said standard elements;

a step for receiving various inputted recognition data comprising a plurality of consecutive recognition elements;

a step for generating said plurality of consecutive recognition elements from said inputted recognition data;

a step for calculating respective parent node distances of similarity for each of said recognition elements;

a step for selecting ones of said parent nodes based on a magnitude of said respective parent node distances of similarity;

a step for calculating respective subordinate node distances of similarity for each of said recognition elements only for ones of said subordinate nodes linked to said selected parent nodes;

a step for storing only once, in order, at predetermined positions, said respective parent node distances of similarity, and for storing, in order, at other predetermined positions, only said respective subordinate node distances of similarity for said subordinate nodes of said selected parent nodes;

a step for storing, for each of said parent nodes, for each of said recognition elements, an identifier indicating the presence or absence of subordinate node distances;

a step for storing, as position data, the storage positions of said subordinate node distances in said distance storing means for each said identifier indicating said presence of said subordinate node distances;

a step for reading said identifiers from said identifier storing means according to identification data of said parent nodes;

a step for reading said subordinate node distances from said distance storing means corresponding to said position data when one of said identifiers indicates that said subordinate node distances are present;

a step for reading said parent node distances from said predetermined positions when one of said identifiers indicates that said subordinate node distances are not present;

a step for calculating respective standard data item distances for consecutive ones of said recognition elements, based on distances read by said distance reading means; and a step for selectively outputting standard data, for which said distances accumulated by said distance accumulating means are smallest, as the recognition result.

28. An information storage medium:

on which a plurality of items of standard data are catalogued in advance that are made up from a plurality of consecutive standard elements and that individually correspond to prescribed recognition data;

on which tree structure data are catalogued in advance wherein one root node and a large number of subordinate nodes that individually correspond to all standard elements are linked by means of a small number of parent nodes that individually correspond on average to a plurality of mutually similar standard elements; and on which is stored a program that allows a computer to:
accept input of various recognition data constituted by a plurality of consecutive recognition elements;
divide inputted recognition data into prescribed frames and generate a plurality of consecutive recognition elements;
individually calculate distances of similarity of a plurality of parent nodes of tree structure data with respect to generated recognition elements;
select parent nodes having small calculated distances;
individually calculate distances of a plurality of subordinate nodes of selected parent nodes with respect to recognition elements;
temporarily store, only once, at predetermined positions, calculated distances of parent nodes and store, in other predetermined positions, only distances of said subordinate nodes for which said distances are calculated;
individually calculate distances of a plurality of standard data with respect to one item of recognition data by accumulating stored distances as distances of standard elements corresponding to standard data; and
selectively output the item of standard data for which the accumulated distance is smallest as the recognition result.

29. An information storage medium:
on which a plurality of items of standard data are catalogued in advance that are made up from a plurality of consecutive standard elements and that individually correspond to prescribed recognition data;
on which tree structure data are catalogued in advance wherein one root node and a large number of subordinate nodes that individually correspond to all standard elements are linked by means of a small number of parent nodes that individually correspond on average to a plurality of mutually similar standard elements; and
on which is stored a program that allows a computer to:
accept input of various recognition data constituted by a plurality of consecutive recognition elements;
divide inputted recognition data into prescribed frames and generate a plurality of consecutive recognition elements;
individually calculate distances of similarity of a plurality of parent nodes of tree structure data with respect to generated recognition elements;
select parent nodes having small calculated distances;
individually calculate distances of a plurality of subordinate nodes of selected parent nodes with respect to recognition elements;
temporarily store, only once, at predetermined positions, calculated distances of parent nodes and store, in other predetermined positions, only distances of said subordinate nodes for which said distances are calculated;
individually store identifiers indicating the presence or absence of subordinate node distances for each item of identification data of a parent node;
individually store storage positions of subordinate node distances as position data for every item of identification data of a parent node in which an identifier indicating the presence of distances is set;
read identifiers according to identification data of parent nodes of tree structure data;
read distances of subordinate nodes corresponding to position data when an identifier indicates the presence of distances;
read distances of a parent node from a prescribed position when an identifier indicates that distances are not present;
individually calculate distances of a plurality of standard data with respect to one item of recognition data by accumulating read distances as distances of standard elements corresponding to standard data; and
selectively output the item of standard data for which the accumulated distance is smallest as the recognition result.

30. An information storage medium on which is stored a program that allows a computer to:
accept input of various recognition data constituted by a plurality of consecutive recognition elements;
divide inputted recognition data into prescribed frames and generate a plurality of consecutive recognition elements;
individually calculate distances of similarity of a plurality of parent nodes of tree structure data with respect to generated recognition elements; select parent nodes having small calculated distances;
individually calculate distances of a plurality of subordinate nodes of selected parent nodes with respect to recognition elements;
temporarily store only once, at predetermined positions, calculated distances of parent nodes and store, in other predetermined positions, only distances of said subordinate nodes for which said distances are calculated;
individually store identifiers indicating the presence or absence of subordinate node distances for each item of identification data of a parent node;
individually store storage positions of subordinate node distances as position data for every item of identification data of a parent node in which an identifier indicating the presence of distances is set;
read identifiers according to identification data of parent nodes of tree structure data;
read the distance of a subordinate node according to position data when an identifier indicates the presence of distance;
read the distance of a parent node from a prescribed position when an identifier indicates that distance is not present;
individually calculate distances of a plurality of standard data with respect to one item of recognition data by accumulating read distances as distances of standard elements corresponding to standard data; and
selectively output the item of standard data for which the accumulated distance is smallest as the recognition result.

* * * * *

UNITED STATES PATENT AND TRADEMARK OFFICE
CERTIFICATE OF CORRECTION

PATENT NO. : 6,112,173
DATED : August 29, 2000
INVENTOR(S) : Hiroshi Hirayama

It is certified that error appears in the above-identified patent and that said Letters Patent is hereby corrected as shown below:

Delete the Title insert --EFFICIENT-MEMORY-USAGE PATTERN RECOGNITION UTILIZING A TREE STRUCTURE WITH A LIMITED NUMBER OF PARENT NODES AND A PLURALITY OF SUBORDINATE NODES CONTAINING SIMILAR DATA--

Column 1,
Line 61, delete "lake" insert --take--

Column 2,
Line 28, delete "tho" insert --the--;
Line 52, delete "c" insert --e--

Signed and Sealed this

Nineteenth Day of June, 2001

Attest:

NICHOLAS P. GODICI
Attesting Officer
Acting Director of the United States Patent and Trademark Office